US012576663B2

(12) United States Patent
Chidate

(10) Patent No.: US 12,576,663 B2
(45) Date of Patent: Mar. 17, 2026

(54) TREATMENT METHOD

(71) Applicant: SEIKO EPSON CORPORATION, Tokyo (JP)

(72) Inventor: Kosuke Chidate, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 492 days.

(21) Appl. No.: 18/151,043

(22) Filed: Jan. 6, 2023

(65) Prior Publication Data

US 2023/0219360 A1 Jul. 13, 2023

(30) Foreign Application Priority Data

Jan. 7, 2022 (JP) ................................ 2022-001475

(51) Int. Cl.
*B41M 7/00* (2006.01)
*B41J 2/01* (2006.01)
(Continued)

(52) U.S. Cl.
CPC .............. *B41M 7/0018* (2013.01); *B41J 2/01* (2013.01); *B41M 5/0017* (2013.01);
(Continued)

(58) Field of Classification Search
CPC ..... C09D 11/326; C09D 11/107; C09D 11/03; C09D 11/037; C09D 11/033; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21;
(Continued)

(56) References Cited

U.S. PATENT DOCUMENTS

2019/0100048 A1* 4/2019 Ohta .................... C09D 11/102
2019/0234015 A1* 8/2019 Chidate ................. D06P 1/6735
(Continued)

FOREIGN PATENT DOCUMENTS

JP 2010-201714 A 9/2010
JP 2010-221634 A 10/2010
(Continued)

*Primary Examiner* — Manish S Shah
(74) *Attorney, Agent, or Firm* — Harness, Dickey & Pierce, P.L.C.

(57) ABSTRACT

A treatment method according to an embodiment of the present disclosure includes: a first treatment agent adhesion step of ejecting a first treatment agent which contains a pigment, first resin particles, water, and a first water-soluble organic solvent from an ink jet head so as to be adhered to a cloth; and a second treatment agent adhesion step of spraying a second treatment agent which contains second resin particles, water, and a second water-soluble organic solvent from a nozzle front hole together with a heated gas to the cloth to which the first treatment agent is adhered so as to be adhered thereto, and the nozzle front hole has a temperature higher than a standard boiling point of the second water-soluble organic solvent by 50° C. or more.

13 Claims, 1 Drawing Sheet

(51) Int. Cl.
*B41M 5/00* (2006.01)
*D06P 1/44* (2006.01)
*D06P 5/30* (2006.01)

(52) U.S. Cl.
CPC ........ *B41M 5/0023* (2013.01); *B41M 5/0047* (2013.01); *B41M 5/0064* (2013.01); *B41M 7/009* (2013.01); *D06P 1/44* (2013.01); *D06P 5/30* (2013.01)

(58) Field of Classification Search
CPC ...... B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2019/0284420 | A1* | 9/2019 | Sugiyama | C09D 11/322 |
| 2020/0172754 | A1* | 6/2020 | Okamoto | B41J 2/01 |
| 2020/0270471 | A1* | 8/2020 | Chidate | C09D 11/30 |
| 2022/0063276 | A1* | 3/2022 | Chidate | B41J 2/16535 |
| 2022/0402281 | A1* | 12/2022 | Maida | B41J 11/002 |

FOREIGN PATENT DOCUMENTS

| | | | |
|---|---|---|---|
| JP | 2020-175665 | A | 10/2020 |
| JP | 2021-085128 | A | 6/2021 |

* cited by examiner

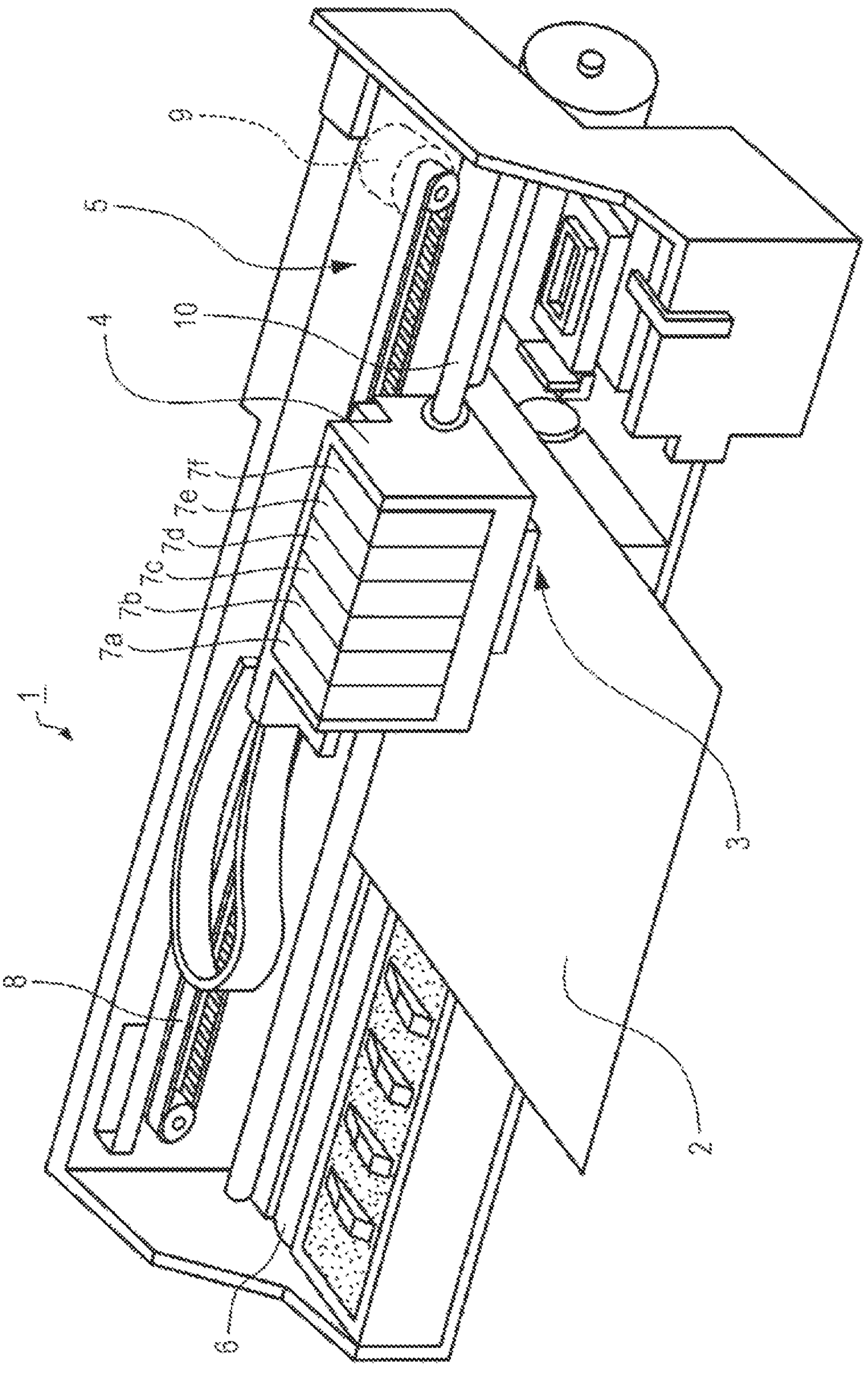
1
2
3
4
5
6
7a
7b
7c
7d
7e
7f
8
9
10

TREATMENT METHOD

The present application is based on, and claims priority from JP Application Serial Number 2022-001475, filed Jan. 7, 2022, the disclosure of which is hereby incorporated by reference herein in its entirety.

BACKGROUND

1. Technical Field

The present disclosure relates to a treatment method.

2. Related Art

Since an ink jet recording method is able to record a highly fine image by a relatively simple apparatus, developments of this method have been rapidly carried out in various fields. Among the developments, various studies have been performed on improvement in friction fastness of a recording medium in recording using an ink containing a pigment. When a content of components, such as resin particles, in the ink is increased, the friction fastness may be improved to a certain extent; however, in this case, clogging of a nozzle of an ink jet head is liable to occur, and a continuous ejection stability is difficult to secure. Hence, for example, there has been proposed a treatment method in which after an image is formed by an ink jet recording method, an overcoat liquid is further applied thereon.

For example, JP-A-2020-175665 has disclosed a method in which after an ink is applied on paper by an ink jet method, an overcoat liquid is sprayed thereon with a heated gas.

However, in the ink jet recording method, an image is also formed on a cloth functioning as a recording medium in some cases. Hence, while an excellent continuous ejection stability is secured, a friction fastness, in particular, a wet friction fastness, of the cloth is also required to be made excellent.

SUMMARY

According to an aspect of the present disclosure, there is provided a treatment method comprising: a first treatment agent adhesion step of ejecting a first treatment agent which contains a pigment, first resin particles, water, and a first water-soluble organic solvent from an ink jet head so as to be adhered to a cloth; and a second treatment agent adhesion step of spraying a second treatment agent which contains second resin particles, water, and a second water-soluble organic solvent from a nozzle front hole together with a heated gas to the cloth to which the first treatment agent is adhered so as to be adhered thereto, and the nozzle front hole has a temperature higher than a standard boiling point of the second water-soluble organic solvent by 50° C. or more.

BRIEF DESCRIPTION OF THE DRAWINGS

FIGURE is a schematic perspective view showing an ink jet recording apparatus according to an embodiment.

DESCRIPTION OF EXEMPLARY EMBODIMENTS

Hereinafter, embodiments of the present disclosure will be described. The following embodiments are described to explain examples of the present disclosure. The present disclosure is not at all limited to the following embodiments and includes various modified and/or changed embodiments to be performed without departing from the scope thereof. In addition, all the structures to be described below are not always required to be essential structures of the present disclosure.

1. TREATMENT METHOD

A treatment method according to an embodiment of the present disclosure includes: a first treatment agent adhesion step of ejecting a first treatment agent which contains a pigment, first resin particles, water, and a first water-soluble organic solvent from an ink jet head so as to be adhered to a cloth; and a second treatment agent adhesion step of spraying a second treatment agent which contains second resin particles, water, and a second water-soluble organic solvent from a nozzle front hole together with a heated gas to the cloth to which the first treatment agent is adhered so as to be adhered thereto, and the nozzle front hole has a temperature higher than a standard boiling point of the second water-soluble organic solvent by 50° C. or more.

It has already been known that the friction fastness of a cloth can be improved to a certain extent by increasing a content of components, such as resin particles, in an ink. However, in this case, since the content of the resin in the ink is increased, clogging of a nozzle of an ink jet head is liable to occur, and as a result, the continuous ejection stability becomes difficult to secure.

Accordingly, after an ink is adhered to a cloth, a post treatment to apply a treatment agent (overcoat liquid) containing components, such as resin particles, to the cloth to which the ink is adhered has been proposed. Since the post treatment as described above is performed, an insufficient friction fastness obtained only by the ink itself can be made preferable, and hence, the continuous ejection stability of the ink can be secured. In the case described above, in order to stably perform the continuous ejection without causing clogging of the nozzle even when components, such as resin particles, are contained in the overcoat liquid, a water-soluble organic solvent is contained in some cases for moisture retention. However, since having a low volatility, a water-soluble organic solvent to be contained for moisture retention is liable to remain on the cloth, and the cloth may not be sufficiently dried in some cases. By the influence of the water-soluble organic solvent remained on the cloth as described above, the friction fastness may be disadvantageously degraded in some cases. In addition, when the cloth is sufficiently dried at a high temperature for a long time, the cloth may be damaged in some cases.

Through intensive research carried out by the present inventor, while an excellent continuous ejection stability is secured, the friction fastness can be made excellent by spraying an overcoat liquid together with a heated gas having a temperature higher than a boiling point of the water-soluble organic solvent described above by a predetermined temperature or more. Although the reason for this is believed that in the state in which the water-soluble organic solvent is evaporated to a certain extent, the overcoat liquid can be adhered to the cloth, the effect of the present disclosure is not limited thereto.

Hereinafter, individual steps of the treatment method according to this embodiment will be described.

1.1 First Treatment Agent Adhesion Step

The treatment method according to this embodiment includes a first treatment agent adhesion step of ejecting a first treatment agent which contains a pigment, first resin particles, water, and a first water-soluble organic solvent from an ink jet head so as to be adhered to a cloth.

Hereinafter, components contained in the first treatment agent will be described.

1.1.1 First Treatment Agent

The first treatment agent at least contains a pigment, first resin particles, water, and a first water-soluble organic solvent. The first treatment agent has a function to form an image on a cloth when being adhered thereto and corresponds to an ink jet ink composition.

1.1.1.1 Pigment

The first treatment agent contains a pigment. As the pigment, for example, an inorganic pigment and/or an organic pigment may be used.

Although the inorganic pigment is not particularly limited, for example, there may be mentioned a carbon black, such as furnace black, lamp black, acetylene black, or channel black; and/or a white inorganic oxide, such as iron oxide, titanium oxide, zinc oxide, or silica.

As the carbon black, for example, C.I. (Colour Index Generic Name) Pigment Black 1, 7, 11 may be mentioned. A commercially available product of the carbon black may also be used, and for example, there may be mentioned No. 2300, No. 900, MCF88, No. 33, No. 40, No. 45, No. 52, MA7, MA8, MA100, or No. 2200B (manufactured by Mitsubishi Chemical Corporation); Raven (registered trademark) 5750, 5250, 5000, 3500, 1255, or 700 (manufactured by Carbon Columbia); Regal (registered trademark) 400R, 330R, or 660R, Mogul (registered trademark) L, Monarch (registered trademark) 700, 800, 880, 900, 1000, 1100, 1300, or 1400 (manufactured by Cabot); or Color Black FW1, FW2, FW2V, FW18, FW200, S150, S160, or S170, or Printex (registered trademark) 35, U, V, or 140U, or Special Black 6, 5, 4A, or 4 (manufactured by Degussa).

As the organic pigment, for example, there may be mentioned a quinacridone-based pigment, a quinacridone quinone-based pigment, a dioxazine-based pigment, a phthalocyanine-based pigment, an anthrapyrimidine-based pigment, an anthanthrone-based pigment, an indanthrone-based pigment, a flavanthrone-based pigment, a perylene-based pigment, a diketopyrrolopyrrole-based pigment, a perinone-based pigment, a quinophthalone-based pigment, an anthraquinone-based pigment, a thioindigo-based pigment, a benzimidazolone-based pigment, an isoindolinone-based pigment, an azomethine-based pigment, or an azo-based pigment.

As a concrete example of the organic pigment, the following may be mentioned.

As a cyan pigment, for example, C.I. Pigment Blue 1, 2, 3, 15:3, 15:4, 15:34, 16, 22, or 60, or C.I. Vat Blue 4 or 60 may be mentioned, and one selected from the group consisting of C.I. Pigment Blue 15:3, 15:4, and 60 or a mixture containing at least two thereof may be preferably mentioned by way of example.

As a magenta pigment, for example, C.I. Pigment Red 5, 7, 12, 48(Ca), 48(Mn), 57(Ca), 57:1, 112, 122, 123, 168, 184, 202, or 209, or C.I. Pigment Violet 19 may be mentioned, and one selected from the group consisting of C.I. Pigment Red 122, 202, and 209 and C.I. Pigment Violet 19 or a mixture containing at least two thereof may be preferably mentioned by way of example.

As a yellow pigment, for example, there may be mentioned C.I. Pigment Yellow 1, 2, 3, 12, 13, 14C, 16, 17, 73, 74, 75, 83, 93, 95, 97, 98, 109, 110, 114, 128, 129, 138, 150, 151, 154, 155, 180, or 185 may be mentioned, and one selected from the group consisting of C.I. Pigment Yellow 74, 109, 110, 128, 138, 150, and 180 or a mixture containing at least two thereof may be preferably mentioned by way of example.

Pigments other than those mentioned above may also be used, and for example, an orange pigment and/or a green pigment may be mentioned.

The pigment may be used alone, or at least two types thereof may be used in combination.

In addition, in order to enhance dispersibility of the pigment in the first treatment agent, the pigment is preferably surface-treated or mixed with a dispersant or the like.

A surface treatment of the pigment is a treatment in which by a physical or a chemical treatment, for example, a carbonyl group, a carboxy group, an aldehyde group, a hydroxy group, a sulfone group, an ammonium group, or a functional group formed from a salt thereof is directly or indirectly bonded to the surface of the pigment.

AS a pigment to be surface-treated, since the ejection stability can be made more excellent, a carbon black is preferable. As the surface-treated pigment, a commercially available product may also be used, and for example, “Microjet CW1” or “Microjet CW2” (manufactured by Oriental Chemical Industries Co., Ltd.) or “CAB-O-JET 200” or “CAB-O-JET 300” (manufactured by Cabot) may be mentioned.

When a dispersant is mixed in the first treatment agent, a dispersant having a hydrophobic portion (hydrophobic group) and a hydrophilic portion (hydrophilic group) in a molecular structure is preferably used. The dispersant as described above has a function such that the hydrophobic portion adsorbs on particle surfaces of the pigment, and the hydrophilic portion is oriented at an aqueous medium side of the first treatment agent. By this function, the pigment tends to be more stably contained in the first treatment agent in the form of dispersion.

Although the dispersant as described above is not particularly limited, for example, an acrylic-based resin, a styrene-acrylic-based resin, such as a styrene-(meth)acrylic acid copolymer or a styrene-(meth)acrylic acid-(meth)acrylate copolymer, a styrene-maleic acid-based resin, a salt of one of those mentioned above, or a formalin condensate of an aromatic sulfonate may be mentioned, and at least one selected from the group consisting of those mentioned above may be used. In addition, as the dispersant, a commercially available product may also be used.

In addition, a method in which particles of the pigment are covered with a resin or the like to impart the dispersibility may also be used. As a method to cover the pigment particles, for example, an acid precipitation method, a phase inversion emulsification method, or a mini-emulsion polymerization method may be used.

Although a content of the pigment can be appropriately adjusted in accordance with applications, the content with respect to a total mass of the first treatment agent is preferably 0.1 to 17.0 percent by mass, more preferably 0.2 to 15.0 percent by mass, further preferably 1.0 to 10.0 percent by mass, and particularly preferably 2.0 to 5.0 percent by mass. When the content of the pigment is in the range described above, the continuous ejection stability tends to be made more excellent.

1.1.1.2 First Resin Particles

The first treatment agent contains first resin particles. The first resin particles are able to further improve, for example, adhesion of an image formed by the pigment in the first treatment agent which is adhered to a cloth.

As the first resin particles, for example, resin particles containing an urethane resin, an acrylic-based resin (including a styrene-acrylic-based resin), a fluorene-based resin, a polyolefin-based resin, a rosin-modified resin, a terpene-based resin, a polyester-based resin, a polyamide-based resin, an epoxy-based resin, a vinyl chloride-based resin, a vinyl chloride-vinyl acetate copolymer, an ethylene-vinyl acetate-based resin, or the like may be mentioned, and resin particles formed from at least one of those mentioned above are preferable. Although those resin particles are frequently handled in the form of an emulsion, the resin particles may also be supplied in the form of powder.

The urethane resin is a generic name of a resin having an urethane bond. As the urethane resin, for example, a polyether type urethane resin having an ether bond in its main chain besides the urethane bond, a polyester type urethane resin having an ester bond in its main chain besides the urethane bond, or a polycarbonate type urethane resin having a carbonate bond in its main chain besides the urethane bond may be used. In addition, as the urethane resin, a commercially available product may also be used, and for example, there may be mentioned Superflex 460, 460s, 840, or E-4000 (trade name, manufactured by DKS Co., Ltd.); Resamine D-1060, D-2020, D-4080, D-4200, D-6300, or D-6455 (trade name, manufactured by Dainichiseika Color & Chemicals Mfg. Co., Ltd.); Takelac WS-6021, WS-6061 or W-512-A-6 (trade name, manufactured by Mitsui Chemicals Polyurethanes Inc.); Suncure 2710 (trade name, manufactured by Lubrizol); or Permarin UA-150 (trade name, manufactured by Sanyo Chemical Industries, Ltd.).

The acrylic-based resin is a generic name of a polymer obtained by polymerization using at least an acrylic-based monomer, such as (meth)acrylic acid or a (meth)acrylate ester, as one component, and for example, a resin obtained from an acrylic-based monomer or a copolymer obtained from an acrylic-based monomer and a monomer other than that may be mentioned. For example, an acrylic vinyl-based resin which is a copolymer obtained from an acrylic-based monomer and a vinyl-based monomer may be mentioned. In addition, as the vinyl-based monomer, for example, styrene may be mentioned.

As the acrylic-based monomer, for example, acrylamide or acrylonitrile may also be used. As resin particles using an acrylic-based resin as a raw material, a commercially available product may also be used, and for example, there may be mentioned FK-854 (trade name, manufactured by Chuo Science Co., Ltd.), Movinyl 952B or 718A (trade name, manufactured by Japan Coating Resin Corporation), or Nipol LX852 or LX874 (trade name, manufactured by Zeon Corporation).

In addition, in this specification, the acrylic-based resin may include a styrene-acrylic-based resin which will be described later. In addition, in this specification, "(meth)acryl" indicates acryl and/or methacryl.

The styrene-acrylic-based resin is a copolymer obtained from a styrene monomer and a (meth)acrylic-based monomer, and for example, a styrene-acrylic acid copolymer, a styrene-methacrylic acid copolymer, a styrene-methacrylic acid-acrylate ester copolymer, a styrene-α-methylstyrene-acrylic acid copolymer, or a styrene-α-methylstyrene-acrylic acid-acrylate ester copolymer may be mentioned. As the styrene-acrylic-based resin, a commercially available product may also be used, and for example, there may be mentioned Joncryl 62J, 7100, 390, 711, 511, 7001, 632, 741, 450, 840, 74J, HRC-1645J, 734, 852, 7600, 775, 537J, 1535, PDX-7630A, 352J, 352D, PDX-7145, 538J, 7640, 7641, 631, 790, 780, or 7610 (trade name, manufactured by BASF); Movinyl 966A, 975N, or 6960 (trade name, manufactured by Japan Coating Resin Corporation); or Vinyblan 2586 (trade name, manufactured by Nisshin Chemical Industry Co., Ltd.).

The polyolefin-based resin is a resin having a structural skeleton of an olefin, such as ethylene, propylene, or butylene, and a known resin may be used by appropriate selection. As the polyolefin resin, a commercially available product may also be used, and for example, Arrowbase CB-1200 or CD-1200 (trade name, manufactured by Unitika Ltd.) may be mentioned.

The polyester-based resin is a resin, such as a poly(ethylene terephthalate) (PET), polymerized by dehydration condensation, for example, between an alkanediol, such as ethylene glycol, and a polyvalent carboxy acid, such as terephthalic acid, and is preferably a water-dispersible polyester resin. As the resin particles of the polyester resin, a commercially available product may also be used, and for example, Vylonal MD-1200, 1500, 2000, 1480, or 1985 (trade name, manufactured by Toyobo Co., Ltd.) may be mentioned.

In addition, although the commercially available products are mentioned above, the first resin particles may also be obtained by synthesis. The first resin particles may be used alone, or at least two types thereof may be used in combination.

In order to improve the friction fastness, the first resin particles are preferably resin particles containing an urethane resin, an acrylic-based resin, and/or a polyester-based resin. In particular, when the first resin particles contain an urethane resin, the friction fastness preferably tends to be further improved. In addition, when the first resin particles contain an urethane resin, and the second resin particles contained in the second treatment agent which will be described later also contain an urethane resin, the adhesion between layers of the first treatment agent and the second treatment agent is further enhanced since the types thereof are similar to each other, and the friction fastness can be improved to be more excellent.

A content of the first resin particles in the first treatment agent with respect to the total mass of the first treatment agent is, as a solid content, preferably 3.0 to 15.0 percent by mass, more preferably 4.0 to 12.0 percent by mass, further preferably 5.0 to 9.0 percent by mass, and particularly preferably 6.0 to 8.0 percent by mass. When the content of the first resin particles described above is in the range described above, while an excellent continuous ejection stability is secured, the friction fastness tends to be made preferable.

1.1.1.3 Water

The first treatment agent contains water.

Although the water is not particularly limited, for example, pure water, such as ion exchange water, ultrafiltration water, reverse osmosis water, or distilled water, or water, such as ultrapure water, in which ionic impurities are removed as much as possible may be mentioned. In addition, in the case in which water sterilized by ultraviolet radiation, addition of hydrogen peroxide, or the like is used, generation of fungi and bacteria can be prevented when the first treatment agent is stored for a long time. As a result, a storage stability tends to be further improved.

A content of the water with respect to the total mass of the first treatment agent is preferably 50 percent by mass or more, more preferably 55 percent by mass or more, even more preferably 60 percent by mass or more, further preferably 65 percent by mass or more, even further preferably 70 percent by mass or more, and particularly preferably 75 percent by mass or more. In addition, although an upper limit of the content of the water is not particularly limited, the upper limit described above with respect to the total mass of the first treatment agent is preferably 90 percent by mass or less and more preferably 80 percent by mass or less.

1.1.1.4 First Water-Soluble Organic Solvent

The first treatment agent contains a first water-soluble organic solvent. As one function of the first water-soluble organic solvent, for example, an improvement in wettability of the first treatment agent to a cloth and/or an enhancement of moisture retaining property of the first treatment agent may be mentioned. In addition, the first water-soluble organic solvent is also able to function as a penetrant.

In addition, in this specification, a "water-soluble" organic solvent indicates an organic solvent having a solubility of 0.1 g or more with respect to 100 g of water at 20° C.

As the first water-soluble organic solvent, for example, there may be mentioned an ester, an alkylene glycol ether, a cyclic ester, a nitrogen-containing solvent, an alcohol, or a polyvalent alcohol. As the nitrogen-containing solvent, for example, a cyclic amide or an acyclic amide may be mentioned. As the acyclic amide, for example, an alkoxyalkylamide may be mentioned.

As the ester, for example, there may be mentioned a glycol monoacetate, such as ethylene glycol monomethyl ether acetate, ethylene glycol monoethyl ether acetate, ethylene glycol monobutyl ether acetate, diethylene glycol monomethyl ether acetate, diethylene glycol monoethyl ether acetate, diethylene glycol monobutyl ether acetate, propylene glycol monomethyl ether acetate, dipropylene glycol monomethyl ether acetate, or methoxybutyl acetate; or a glycol diester, such as ethylene glycol diacetate, diethylene glycol diacetate, propylene glycol diacetate, dipropylene glycol diacetate, ethylene glycol acetate propionate, ethylene glycol acetate butyrate, diethylene glycol acetate butyrate, diethylene glycol acetate propionate, propylene glycol acetate propionate, propylene glycol acetate butyrate, dipropylene glycol acetate butyrate, or dipropylene glycol acetate propionate.

As the alkylene glycol ether, a monoether or a diether of an alkylene glycol may be used, and an alkyl ether is preferable. As a concrete example thereof, for example, there may be mentioned an alkylene glycol monoalkyl ether, such as ethylene glycol monomethyl ether, ethylene glycol monoethyl ether, ethylene glycol monoisopropyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, propylene glycol monopropyl ether, propylene glycol monobutyl ether, dipropylene glycol monomethyl ether, dipropylene glycol monoethyl ether, dipropylene glycol monopropyl ether, dipropylene glycol monobutyl ether, or tripropylene glycol monobutyl ether; or an alkylene glycol dialkyl ether, such as ethylene glycol dimethyl ether, ethylene glycol diethyl ether, ethylene glycol dibutyl ether, diethylene glycol dimethyl ether, diethylene glycol diethyl ether, diethylene glycol dibutyl ether, diethylene glycol methyl ethyl ether, diethylene glycol methyl butyl ether, triethylene glycol dimethyl ether, triethylene glycol diethyl ether, triethylene glycol dibutyl ether, triethylene glycol methyl butyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, or tripropylene glycol dimethyl ether.

In addition, since the first resin particles in the first treatment agent are likely to be dissolved or swelled, and the friction fastness of an image to be formed can be further improved, among the alkylene glycols mentioned above, the diether is more preferable as compared to the monoether.

As the cyclic ester, for example, there may be mentioned a cyclic ester (lactone), such as β-propiolactone, γ-butyrolactone, δ-valerolactone, ε-caprolactone, β-butyrolactone, β-valerolactone, γ-valerolactone, β-hexanolactone, γ-hexanolactone, δ-hexanolactone, β-heptanolactone, γ-heptanolactone, δ-heptanolactone, ε-heptanolactone, γ-octanolactone, δ-octanolactone, ε-octanolactone, δ-nonalactone, ε-nonalactone, or ε-decanolactone; or a compound in which a hydrogen atom of a methylene group adjacent to a carbonyl group of one of those mentioned above is replaced by an alkyl group having 1 to 4 carbon atoms.

As the alkoxyalkylamide, for example, there may be mentioned 3-methoxy-N,N-dimethylpropionamide, 3-methoxy-N,N-diethylpropionamide, 3-methoxy-N,N-methylethylpropionamide, 3-ethoxy-N,N-dimethylpropionamide, 3-ethoxy-N,N-diethylpropionamide, 3-ethoxy-N,N-methylethylpropionamide, 3-n-butoxy-N,N-dimethylpropionamide, 3-n-butoxy-N,N-diethylpropionamide, 3-n-butoxy-N,N-methylethylpropionamide, 3-n-propoxy-N,N-dimethylpropionamide, 3-n-propoxy-N,N-diethylpropionamide, 3-n-proxy-N,N-methylethylpropionamide, 3-iso-propoxy-N,N-dimethylpropionamide, 3-iso-propoxy-N,N-diethylpropionamide, 3-iso-proxy-N,N-methylethylpropionamide, 3-tert-butoxy-N,N-dimethylpropionamide, 3-tert-butoxy-N,N-diethylpropionamide, or 3-tert-butoxy-N,N-methylethylpropionamide.

As the cyclic amide, a lactam may be mentioned, and for example, there may be mentioned a pyrrolidone, such as 2-pyrrolidone, 1-methyl-2-pyrrolidone, 1-ethyl-2-pyrrolidone, 1-propyl-2-pyrrolidone, or 1-butyl-2-pyrrolidone. Those mentioned above are preferable since the film formation of the resin particles is promoted, and in particular, 2-pyrrolidone is more preferable.

In addition, as the alkoxyalkylamide, a compound represented by the following general formula (1) is also preferably used.

$$R^1\text{—O—}CH_2CH_2\text{—(C=O)—}NR^2R^3 \qquad (1)$$

In the above formula (1), $R^1$ represents an alkyl group having 1 to 4 carbon atoms, and $R^2$ and $R^3$ each independently represent a methyl group or an ethyl group. The "alkyl group having 1 to 4 carbon atoms" may be a linear or branched alkyl group, and for example, a methyl group, an ethyl group, an n-propyl group, an iso-propyl group, an n-butyl group, a sec-butyl group, an iso-butyl group, or a tert-butyl group may be used. The compound represented by the above formula (1) may be used alone, or at least two types thereof may be used in combination.

As the function of the compound represented by the formula (1), for example, improvement in surface drying property and fixability of the first treatment agent adhered to a cloth may be mentioned.

In addition, in the above formula (1), $R^1$ more preferably represents a methyl group having one carbon atom. In the above formula (1), a standard boiling point of the compound in which $R^1$ represents a methyl group is low as compared to a standard boiling point of a compound in which $R^1$ represents an alkyl group having 2 to 4 carbon atoms. Hence, in the above formula (1), when a compound in which $R^1$ represents a methyl group is used, a surface drying property (in particular, a surface drying property of an image recorded in a high-temperature and high-humidity environment) in an adhesion area may be further improved in some cases.

When the compound represented by the above formula (1) is used, although a content thereof with respect to the total mass of the first treatment agent is not particularly limited, the content described above is approximately 5 to 50 percent by mass and preferably 8 to 48 percent by mass. Since the content of the compound represented by the above formula (1) is in the range described above, the fixability and the surface drying property (in particular, a surface drying property of an image recorded in a high-temperature and high-humidity environment) of the image may be further improved in some cases.

As the alcohol, for example, a compound in which one hydrogen atom of an alkane is replaced by a hydroxy group may be mentioned. As the alkane, an alkane having 10 carbon atoms or less is preferable, an alkane having 6 carbon atoms or less is more preferable, and an alkane having 3 carbon atoms or less is further preferable. The number of carbon atoms of the alkane is 1 or more and preferably 2 or more. The alkane may be linear or branched. As the alcohol, for example, methanol, ethanol, n-propyl alcohol, iso-propyl alcohol, n-butanol, 2-butanol, tert-butanol, iso-butanol, n-pentanol, 2-pentanol, 3-pentanol, or tert-pentanol may be mentioned.

The polyvalent alcohol is a compound having at least two hydroxy groups in its molecule. The polyvalent alcohol may be classified, for example, into an alkanediol and a polyol.

As the alkanediol, for example, a compound in which an alkane is replaced by two hydroxy groups may be mentioned. As the alkanediol, for example, there may be mentioned ethylene glycol (alias: ethane-1,2-diol), propylene glycol (alias: propane-1,2-diol, standard boiling point: 189° C.), 1,2-butanediol, 1,2-pentanediol, 1,2-hexanediol, 1,2-octanediol, 1,3-propanediol, 1,3-butylene glycol (alias: 1,3-butanediol), 1,4-butanediol, 2,3-butanediol, 1,2-pentanediol, 1,5-pentanediol, 2,4-pentanediol, 2-methyl-1,3-propanediol, 3-methyl-1,3-butanediol, 3-methyl-1,5-pentanediol, 2-ethyl-1,3-hexanediol, 2-methyl-1,3-pentanediol, 3-methyl-1,5-pentanediol, 2-methylpentane-2,4-diol, 1,6-hexanediol, 2-ethyl-2-methyl-1,3-propanediol, or 2-methyl-2-propyl-1,3-propanediol.

As the polyol, for example, a condensate in which at least two alkanediol molecules are intermolecular condensed between hydroxy groups or a compound having at least three hydroxy groups may be mentioned.

As the condensate in which at least two alkanediol molecules are intermolecular condensed between hydroxy groups, for example, there may be mentioned a dialkylene glycol, such as diethylene glycol (standard boiling point: 245° C.) or dipropylene glycol, or a trialkylene glycol, such as triethylene glycol (standard boiling point: 287° C.) or tripropylene glycol.

The compound having at least three hydroxy groups is a compound which has an alkane structure or a polyether structure as a skeleton and at least three hydroxy groups. As the compound having at least three hydroxy groups, for example, glycerin (standard boiling point: 290° C.), trimethylolethane, trimethylolpropane, 1,2,5-hexanetriol, 1,2,6-hexanetriol, pentaerythritol, or a polyoxypropylene triol may be mentioned.

The alkanediol and the polyol are each able to function primarily as a penetrating solvent and/or a moisture retaining solvent. In addition, the alkanediol primarily tends to function as a penetrating solvent, and the polyol primarily tends to function as a moisture retaining solvent.

The first water-soluble organic solvent may be used alone, or at least two types thereof may be used in combination.

A content of the first water-soluble organic solvent with respect to the total mass of the first treatment agent is preferably 2 to 20 percent by mass, more preferably 4 to 18 percent by mass, even more preferably 5 to 16 percent by mass, further preferably 7 to 14 percent by mass, and particularly preferably 8 to 12 percent by mass. When the content of the first water-soluble organic solvent is in the range described above, the friction fastness and the continuous ejection stability tend to be improved with good balance.

In addition, a content of a first water-soluble organic solvent having a standard boiling point of 180° C. or more, preferably 220° C. or more, more preferably 260° C. or more, and further preferably 280° C. or more is also preferably set in the range described above. When the content of the first water-soluble organic solvent having a predetermined standard boiling point or more is in the range described above, the balance between the moisture retaining property and the drying property can be made more excellent, and the friction fastness and the continuous ejection stability tend to be made more excellent. In addition, the solvent having a standard boiling point of 180° C. or more will be described later.

1.1.1.5 Surfactant

The first treatment agent may further contain a surfactant. The surfactant has a function to decrease a surface tension of the first treatment agent so as to improve permeability into a cloth. As the surfactant, for example, a nonionic surfactant, an anionic surfactant, a cationic surfactant, or an amphoteric surfactant may be mentioned, and at least one of them may be used.

As the nonionic surfactant, for example, an acetylene glycol-based surfactant, a fluorine-based surfactant, or a silicone-based surfactant may be used. Since at least one of those surfactants is used, at a relatively small content thereof, wettability to a cloth tends to be improved. In addition, as a commercially available product of the acetylene glycol-based surfactant, for example, Olfine E1010 (manufactured by Nisshin Chemical Industry Co., Ltd.) may be mentioned.

When the surfactant is contained in the first treatment agent, a content thereof with respect to the total mass of the first treatment agent is preferably 0.01 to 1.0 percent by mass, more preferably 0.05 to 0.8 percent by mass, even more preferably 0.1 to 0.6 percent by mass, further preferably 0.15 to 0.5 percent by mass, and particularly preferably 0.2 to 0.4 percent by mass. When the content of the surfactant is in the range described above, the continuous ejection stability is made more excellent in some cases.

1.1.1.6 pH Adjuster

The first treatment agent may further contain a pH adjuster. Although the pH adjuster is not particularly limited, for example, an organic base or an inorganic base may be mentioned. As the organic base, for example, an alkanolamine, such as triethanolamine, diethanolamine, monoethanolamine, or tri-iso-propanolamine, may be mentioned. As the inorganic base, for example, a strong base which is a hydroxide of an alkali metal or an alkaline earth metal, such as lithium hydroxide, potassium hydroxide, or calcium hydroxide, may be used.

When the pH adjuster is contained in the first treatment agent, a content thereof with respect to the total mass of the first treatment agent is preferably 0.01 to 1.0 percent by mass, more preferably 0.03 to 0.5 percent by mass, further preferably 0.05 to 0.3 percent by mass, and particularly preferably 0.07 to 0.15 percent by mass. When the content of the pH adjuster is in the range described above, the dispersion stability of the pigment is improved, and the continuous ejection stability is made more excellent in some cases.

1.1.1.7 Other Components

The first treatment agent may further contain components, if needed, such as an antiseptic agent/fungicide, a corrosion inhibitor, a chelating agent, a viscosity adjuster, an antioxidant, and/or an anti-mold agent.

1.1.2 Cloth

As the form of the cloth to be used for the treatment method according to this embodiment, for example, fabrics, garments, and other accessories may be mentioned. In the fabrics, for example, a woven cloth, a knitted cloth, and a non-woven cloth are included. As the garments and other accessories, for example, there may be mentioned sewn products, such as a T shirt, a handkerchief, a scarf, a towel, a handbag, and a cloth-made bag; furniture, such as a curtain, a sheet, a bed cover, and wallpaper; and fabrics before and after cutting to be used as materials to be sewn. As the forms of those materials described above, for example, there may be mentioned a material having a long roll shape, a material having a predetermined size by cutting, and a material having a product shape.

A material forming the cloth is not particularly limited, and for example, natural fibers, such as cotton, hemp, wool, or silk; synthetic fibers, such as a polypropylene, a polyester, an acetate, a triacetate, a polyamide (such as a nylon), or a polyurethane; or biodegradable fibers such as a polylactic acid, may be mentioned, and blended fibers thereof may also be used. For example, as a polyester cloth, a cloth formed using, as a forming material, single polyester fibers or blended fibers between a polyester and cotton is preferable, and as a nylon cloth, a cloth formed using, as a forming material, single nylon fibers (nylon) or blended fibers between a nylon and cotton is preferable.

The polyester fiber is a fiber synthesized, for example, by dehydration condensation between a polyvalent alcohol and a polyvalent carboxylic acid. As the polyvalent alcohol, an alkanediol is preferable, and as a concrete example thereof, for example, ethylene glycol, 1,3-propanediol, 1,4-butanediol, or 1,4-cyclohexanedimethanol may be mentioned. As the polyvalent carboxylic acid, for example, terephthalic acid or 2,6-naphthalenedicarboxylic acid may be mentioned. As the polyester fiber, for example, there may be mentioned a fiber formed of a poly(ethylene terephthalate) (condensation between terephthalic acid and ethylene glycol), a poly (trimethylene terephthalate) (condensation between terephthalic acid and 1,3-propanediol), a poly(butylene terephthalate) (condensation between terephthalic acid and 1,4-butanediol), a poly(ethylene naphthalate) (condensation between 2,6-naphthalenedicarboxylic acid and ethylene glycol), or a poly(butylene terephthalate) (condensation between 2,6-naphthalenedicarboxylic acid and 1,4-butanediol).

As the nylon fiber, there are a so-called n-nylon fiber synthesized by ring-opening polymerization of a cyclic lactam and a so-called n,m-nylon fiber synthesized by polycondensation between a dicarboxylic acid and a diamine. As the n-nylon fiber, for example, a nylon 6 (ring-opening polymerization of ε-caprolactam), a nylon 11 (ring-opening polymerization of undecane lactam), or a nylon 12 (ring-opening polymerization of lauryl lactam) may be mentioned. As the n,m-nylon fiber, for example, a nylon 66 (condensation between adipic acid and hexamethylenediamine), a nylon 610 (condensation between sebacic acid and hexamethylenediamine), a nylon 6T (condensation between terephthalic acid and hexamethylenediamine), a nylon 61 (condensation between isophthalic acid and hexamethylenediamine), a nylon 9T (condensation between terephthalic acid and nonanediamine), or a nylon M5T (condensation between terephthalic acid and methylpentanediamine) may be mentioned.

In order to significantly achieve the operational effect of the present disclosure, as the cloth, a cloth formed using a polyester or a nylon is preferably selected. The cloth selectively formed using the material as described above is liable to be damaged by heat and cannot be dried at a high temperature for a long time. However, according to the treatment method of this embodiment, since the second treatment agent is sprayed together with a heated gas, evaporation of a volatile component is likely to be promoted. Hence, without performing heating at a high temperature for a long time, a sufficient drying can be performed, and hence, even if the cloth as described above is used, while the damage caused by heating is reduced, the friction fastness can be made preferable.

A weight per unit area of the cloth is preferably 1.0 to 10.0 Oz, more preferably 2.0 to 9.0 Oz, even more preferably 3.0 to 8.0 Oz, and further preferably 4.0 to 7.0 Oz.

1.1.3 Adhesion Method

The first treatment agent adhesion step is a step to eject the first treatment agent described above from an ink jet head so as to be adhered to a cloth.

1.1.3.1. Recording Apparatus

Hereinafter, an ink jet recording apparatus which includes an ink jet head and which can be used for the first treatment agent adhesion step will be described with reference to FIGURE. The ink jet recording apparatus is an apparatus to perform recording by landing liquid droplets on a recording medium such as a cloth by an ink jet method which ejects fine liquid droplets of an ink composition (first treatment agent). FIG. 1*s* a schematic perspective view showing an ink jet recording apparatus to be used for the first treatment agent adhesion step according to this embodiment. In this embodiment, as the ink jet recording apparatus, an on-carriage type printer in which an ink cartridge is mounted on a carriage will be described by way of example. In addition, in order to recognize individual members in FIGURE, the scales of the members are changed from the actual scales thereof.

A printer 1 of this embodiment is a so-called serial printer. The serial printer is a printer in which an ink jet head is mounted on a carriage which moves in a predetermined direction, and while the ink jet head is transferred concomitant with the transfer of the carriage, recording is performed.

As shown in FIGURE, the printer 1 includes an ink jet head 3, a carriage 4, a main scanning mechanism 5, a platen roller 6, and a control portion (not shown) to control all the operation of the printer 1. The carriage 4 mounts the ink jet head 3 and is detachably fitted with ink cartridges 7*a*, 7*b*, 7*c*, 7*d*, 7*e*, and 7*f* which receive ink compositions to be supplied to the ink jet head 3.

The main scanning mechanism 5 includes a timing belt 8 connected to the carriage 4, a motor 9 to drive the timing belt 8, and a guide shaft 10. The guide shaft 10 is provided in a scanning direction (main scanning direction) of the carriage 4 as a support member thereof. The carriage 4 is driven by the motor 9 through the timing belt 8 and can be reciprocally transferred along the guide shaft 10. Accordingly, the main scanning mechanism 5 has a function to reciprocally transfer the carriage 4 in the main scanning direction.

The platen roller 6 has a function to transport a cloth 2 on which recording is to be performed in a sub-scanning direction (length direction of the cloth 2) perpendicular to the above main scanning direction. Hence, the cloth 2 is transported in the sub-scanning direction. In addition, the carriage 4 on which the ink jet head 3 is mounted is able to reciprocally move in the main scanning direction approximately equivalent to the width direction of the cloth 2, and the ink jet head 3 is configured to be scanned relatively with respect to the cloth 2 in the main scanning direction and the sub-scanning direction.

The ink cartridges 7*a*, 7*b*, 7*c*, 7*d*, 7*e*, and 7*f* are independent six ink cartridges. In each of the ink cartridges 7*a*, 7*b*, 7*c*, 7*d*, 7*e*, and 7*f*, the first treatment agent of this embodiment can be received. In these ink cartridges, first treatment agents showing a black, a cyan, a magenta, a yellow, a white, and an orange color are separately received and may be appropriately used in arbitrary combination. In FIGURE, although the number of the ink cartridges is 6, the number described above is not limited thereto. At bottom portions of the ink cartridges 7*a*, 7*b*, 7*c*, 7*d*, 7*e*, and 7*f*, supply ports (not shown) to supply the first treatment agents received in the ink cartridges to the ink jet head 3 are provided.

The ink jet head 3 has a nozzle surface (not shown) on a plane facing the cloth 2. In the nozzle surface, nozzle lines (not shown) each composed of nozzles (not shown) are separately arranged so as to correspond to the first treatment agents of the individual colors. The first treatment agents of the individual colors are supplied from the respective ink cartridges to the ink jet head 3 and are then ejected from the nozzles in the form of liquid droplets by an actuator (not shown) provided in the ink jet head 3. The liquid droplets of the first treatment agent thus ejected are landed on the cloth 2, and as a result, an image, a text, a pattern, and/or a color is formed in a recording area of the cloth 2.

In addition, in the ink jet head 3, although a piezoelectric element is used as the actuator (driving device), the actuator is not limited thereto. For example, as the actuator, an electromechanical conversion element to displace a vibration plate by electrostatic adsorption or a thermoelectric conversion element to eject the first treatment agent in the form of liquid droplets by bubbles generated by heating may also be used.

In addition, in this embodiment, although the on-carriage type printer 1 is described by way of example as the ink jet recording apparatus, the ink jet recording apparatus is not limited thereto. For example, an off-carriage type printer in which an ink receiving container, such as an ink cartridge, is not mounted on a carriage may also be used. In addition, the ink jet recording apparatus used in the present disclosure is not limited to the serial printer described above, and a line head printer in which an ink jet head is formed to have a length equivalent to or larger than the width of the cloth 2, and recording is performed without transferring the ink jet head may also be used.

1.1.3.2. Adhesion Conditions and the Like

In the first treatment agent adhesion step, the maximum adhesion amount of the first treatment agent to the cloth can be set to 1 to 200 mg/cm$^2$, is preferably 1 to 30 mg/cm$^2$, more preferably 2 to 25 mg/cm$^2$, further preferably 5 to 20 mg/cm$^2$, particularly preferably 7 to 15 mg/cm$^2$. In the case described above, it is preferable since a color development property of an image to be recorded is made excellent, the drying property of the image to be recorded is made excellent, bleeding of the image can be suppressed, and an image, such as a picture or a character, can be reproducibly recorded on the cloth.

1.2. Second Treatment Agent Adhesion Step

The treatment method according to this embodiment includes a second treatment agent adhesion step of spraying a second treatment agent which contains second resin particles, water, and a second water-soluble organic solvent from a nozzle front hole together with a heated gas to the cloth to which the first treatment agent is adhered so as to be adhered thereto, and a temperature of the nozzle front hole is higher than a standard boiling point of the second water-soluble organic solvent by 50° C. or more.

Hereinafter, components contained in the second treatment agent will be described.

1.2.1. Second Treatment Agent

The second treatment agent at least contains second resin particles, water, and a second water-soluble organic solvent. The second treatment agent is adhered to the cloth to which the first treatment agent is adhered and corresponds to a so-called post-treatment liquid or overcoat liquid.

1.2.1.1. Second Resin Particles

The second treatment agent contains second resin particles. The second resin particles have a function to improve the friction fastness by adhesion thereof to the cloth. As the second resin particles, resin particles similar to the first resin particles described above may also be used. In addition, the type of the second resin particles may be similar to or different from that of the first resin particles.

In order to improve the friction fastness, the second resin particles are preferably resin particles containing an urethane resin, an acrylic-based resin, and/or a polyester-based resin. In particular, when the second resin particles contain an urethane resin, it is preferable since the friction fastness tends to be further improved. In addition, when the second resin particles contain an urethane resin, and the first resin particles contained in the first treatment agent described above also contain an urethane resin, the adhesion between the layers of the first treatment agent and the second treatment agent is more enhanced since the types thereof are similar to each other, and as a result, the friction fastness can be improved to be more excellent.

A content of the second resin particles in the second treatment agent with respect to a total mass of the second treatment agent is, as a solid content, preferably 3.0 to 20.0 percent by mass, more preferably 6.0 to 15.0 percent by mass, even more preferably 7.0 to 14.0 percent by mass, further preferably 8.0 to 12.0 percent by mass, and particularly preferably 9.0 to 11.0 percent by mass. When the content of the second resin particles is in the range described above and is, in particular, 6.0 to 15.0 percent by mass, while a preferable continuous ejection stability is secured, the friction fastness tends to be made more preferable.

In addition, in order to further improve the friction fastness, a lower limit of the content of the second resin particles in the second treatment agent with respect to the total mass of the second treatment agent is, as a solid content, preferably 3.0 percent by mass or more, more preferably 6.0 percent by mass or more, even more preferably 7.0 percent by mass or more, further preferably 8.0 percent by mass or more, and particularly preferably 9.0 percent by mass or more. Since a preferable continuous ejection stability can be secured, an upper limit of the content of the second resin particles in the second treatment agent with respect to the total mass of the second treatment agent is, as a solid content, preferably 20.0 percent by mass or less, more preferably 15.0 percent by mass or less, even more preferably 14.0 percent by mass or less, further preferably 12.0 percent by mass or less, and particularly preferably 11.0 percent by mass or less.

The content of the second resin particles with respect to the total mass of the second treatment agent is preferably equivalent to or higher than the content of the first resin particles with respect to the total mass of the first treatment agent and is more preferably higher than the content of the first resin particles with respect to the total mass of the first treatment agent. When the relationship as described above is satisfied, while a preferable continuous ejection stability is secured for both the first treatment agent and the second treatment agent, the friction fastness tends to be made more preferable.

The content of the second resin particles with respect to the total mass of the second treatment agent is higher than the content of the first resin particles with respect to the total mass of the first treatment agent preferably by 1.0 percent by mass or more, more preferably by 2.0 percent by mass or more, and further preferably 3.0 percent by mass or more. In addition, the content of the second resin particles with respect to the total mass of the second treatment agent is higher than the content of the first resin particles with respect to the total mass of the first treatment agent preferably by 8.0 percent by mass or less, more preferably by 6.0 percent by mass or less, and further preferably 4.0 percent by mass or less. When the relationship as described above is satisfied, while a preferable continuous ejection stability is secured for both the first treatment agent and the second treatment agent, the friction fastness tends to be made more preferable.

1.2.1.2 Water

The second treatment agent contains water. The water used in the second treatment agent is similar to that described in the first treatment agent.

A content of the water with respect to the total mass of the second treatment agent is preferably 55 percent by mass or more, more preferably 60 percent by mass or more, even more preferably 65 percent by mass or more, further preferably 70 percent by mass or more, even further preferably 75 percent by mass or more, and particularly preferably 80 percent by mass or more. In addition, although an upper limit of the content of the water is not particularly limited, the upper limit described above with respect to the total mass of the second treatment agent is preferably 95 percent by mass or less and more preferably 90 percent by mass or less.

1.2.1.3 Second Water-Soluble Organic Solvent

The second treatment agent contains a second water-soluble organic solvent. As the function of the second water-soluble organic solvent, for example, improvement in continuous ejection stability by enhancement in moisture retaining property of the second treatment agent may be mentioned. As the second water-soluble organic solvent, an organic solvent similar to the first water-soluble organic solvent described above may be used, and the second water-soluble organic solvent may be used alone, or at least two types thereof may be used in combination. In addition, the type of the second water-soluble organic solvent may be similar to or different from the type of the first water-soluble organic solvent.

In the second treatment agent, as the second water-soluble organic solvent, a solvent having an SP value of 9.0 to 11.0 is preferably contained, a solvent having an SP value of 9.2 to 10.8 is more preferably contained, a solvent having an SP value of 9.4 to 10.6 is further preferably contained, and a solvent having an SP value of 9.5 to 10.4 is particularly preferably contained. In the treatment method according to this embodiment, since the second treatment agent is sprayed together with a heated gas, a volatile component is reduced when the second treatment agent is adhered to the cloth, and hence, the wettability may be degraded in some cases. Even in the case as described above, since the solvent having an SP value in the range described above is contained, the wettability of the second treatment agent to a coating surface can be made preferable, and by a relatively small amount of a coating amount, the second treatment agent tends to be uniformly applied.

In addition, the solubility parameter (SP value) will be described. The SP value in the present disclosure is an SP value based on Hansen method. The SP value δ of Hansen method is classified into three terms and is calculated based on the equation, $\delta^2=\delta d^2+\delta p^2+\delta h^2$. δd, δp, and δh represent solubility parameters corresponding to the dispersion force term, the dipole force term, and the hydrogen bond force term, respectively.

In addition, the unit of the SP value is $(cal/cm^3)^{1/2}$, and the SP value is a value (also called "HSP") proposed by Dr. Hansen based on the assumption in that "two materials having similar intermolecular interactions are likely to be dissolved in each other". The SP value can be estimated by calculation and can also be experimentally or empirically obtained, and SP values of many materials have been disclosed in various types of documents. In this embodiment, as the SP value, a value calculated using computational software, Hansen-Solubility HSPiP, may be used.

Hereinafter, some second water-soluble organic solvents and the SP values thereof based on Hansen method will be shown below by way of example (but not limited thereto). For example, there may be mentioned methanol (SP value: 14.84), ethanol (SP value: 11.8), 2-propanol (SP value: 12.7), n-propyl alcohol (SP value: 11.8), 1,3-butanediol (SP value: 14.47), 1,4-butanediol (SP value: 12.1), 1,2-hexanediol (SP value: 12.2), 2-methyl-1,3-pentanediol (SP value: 10.3), butoxypropanol (SP value: 8.9), dipropylene glycol (SP value: 12.9), triethylene glycol (SP value: 13.8), 2-ethyl-1,3-hexanediol (SP value: 11.6), tetraethylene glycol (SP value: 12.6), glycerin (SP value: 16.5), hexane (SP value: 7.45), cyclohexane (SP value: 8.40), 3,5,5-trimethyl-2-cyclohexene-1-one (SP value: 8.87), xylene (SP value: 8.95), ethylbenzene (SP value: 8.93), γ-butyrolactone (SP value: 14.8), 2-pyrrolidone (γ-butyrolactam) (SP value: 14.2), butyl acetate (SP value: 8.70), ethyl octanoate (SP value: 8.3), 3-methoxybutyl acetate (SP value: 8.71), oleic acid (SP value: 8.69), dodecyl acrylate (SP value: 8.63), diethyl ether (SP value: 7.82), ethyl propyl ether (SP value: 8.8), ethylene glycol monomethyl ether (SP value: 11.4), ethylene glycol monoisopropyl ether (SP value: 9.2), ethylene glycol monobutyl ether (SP value: 9.8), ethylene glycol diethyl ether (SP value: 8.6), diethylene glycol monomethyl ether (SP value: 10.7), diethylene glycol monobutyl ether (SP value: 9.5), diethylene glycol monoisobutyl ether (SP value: 8.7), diethylene glycol dimethyl ether (SP value: 9.4), diethylene glycol ethyl methyl ether (SP value: 8.3), diethylene glycol diethyl ether (SP value: 8.1), diethylene glycol isopropyl methyl ether (SP value: 7.9), diethylene glycol butyl methyl ether (SP value: 8.1), diethylene glycol dibutyl ether (SP value: 7.7), propylene glycol monomethyl ether (SP value: 10.4), propylene glycol n-propyl ether (SP value: 9.8), propylene glycol n-butyl ether (SP value: 9.7), propylene glycol monophenyl ether (SP value: 9.4), dipropylene glycol monomethyl ether (SP value: 9.6), dipropylene glycol monoethyl ether (SP value: 10.9), dipropylene glycol n-propyl ether (SP value: 9.5), dipropylene glycol n-butyl ether (SP value: 9.4), dipropylene glycol dimethyl ether (SP value:

7.88), triethylene glycol monomethyl ether (SP value: 10.5), triethylene glycol monobutyl ether (SP value: 10.0), triethylene glycol dimethyl ether (SP value: 8.7), triethylene glycol butyl methyl ether (SP value: 8.0), tripropylene glycol monomethyl ether (SP value: 9.1), tripropylene glycol n-butyl ether (SP value: 9.3), tripropylene glycol dimethyl ether (SP value: 7.4), tetraethylene glycol dimethyl ether (SP value: 8.7), ethylene glycol monomethyl ether acetate (SP value: 8.96), ethylene glycol monoethyl ether acetate (SP value: 8.91), ethylene glycol monobutyl ether acetate (SP value: 8.85), diethylene glycol monobutyl ether acetate (SP value: 8.94), or dipropylene glycol monoethyl ether acetate (SP value: 8.6).

Among the solvents mentioned above by way of example, diethylene glycol monobutyl ether (SP value: 9.5) and/or 2-methyl-1,3-pentanediol (SP value: 10.3) is more preferable, and as a result, the balance between the moisture retaining property and the drying property is made more excellent, and the friction fastness and the continuous ejection stability tend to be made more excellent.

A content of the second water-soluble organic solvent with respect to the total mass of the second treatment agent is preferably 1.0 percent by mass or more, more preferably 3.0 percent by mass or more, further preferably 5.0 percent by mass or more, and particularly preferably 7.0 percent by mass or more. Although an upper limit of the content described above is not particularly limited, for example, the upper limit described above is preferably 20.0 percent by mass or less, more preferably 15.0 percent by mass or less, further preferably 13.0 percent by mass or less, and particularly preferably 10.0 percent by mass or less. When the content of the second water-soluble organic solvent is in the range described above and is, in particular, 5.0 percent by mass or more, the friction fastness and the continuous ejection stability tend to be further improved with good balance.

In addition, a content of a second water-soluble organic solvent having a standard boiling point of 180° C. or more is also preferably set in the range described above. Although an upper limit of the standard boiling point is not particularly limited, the upper limit of the standard boiling point is preferably 300° C. or less, more preferably 270° C. or less, even more preferably 240° C. or less, further preferably 210° C. or less, and particularly preferably 190° C. or less. In addition, a lower limit of the standard boiling point may be 220° C. or more, 260° C. or more, and 280° C. or more. When a content of a second water-soluble organic solvent having a predetermined standard boiling point or more is in the range described above, and in particular, when a content of the second water-soluble organic solvent having a standard boiling point of 180° C. or more is 5.0 percent by mass or more with respect to the total mass of the second treatment agent, the balance between the moisture retaining property and the drying property is made more excellent, and the friction fastness and the continuous ejection stability tend to be made more excellent.

As the solvent having a standard boiling point of 180° C. or more, for example, there may be mentioned 1,2-butanediol (194° C.), propylene glycol (189° C.), 1,2-pentanediol (210° C.), 1,2-hexanediol (224° C.), 1,2-heptanediol (227° C.), 1,3-propanediol (210° C.), 1,3-butanediol (230° C.), 1,4-butanediol (230° C.), 1,5-pentanediol (242° C.), 1,6-hexanediol (250° C.), 2-ethyl-2-methyl-1,3-propanediol (226° C.), 2-methyl-2-propyl-1,3-propanediol (230° C.), 2-ethyl-1,3-propanediol (214° C.), 2,2-dimethyl-1,3-propanediol (210° C.), 3-methyl-1,3-butanediol (203° C.), 2-ethyl-1,3-hexanediol (244° C.), 3-methyl-1,5-pentanediol (250° C.), 2-methylpentane-2,4-diol (197° C.), diethylene glycol (245° C.), dipropylene glycol (232° C.), triethylene glycol (287° C.), or glycerin (290° C.). In addition, the numerical value in the parentheses represents the standard boiling point.

1.2.1.4 Other Components

The second treatment agent may further contain components, if needed, such as a pH adjuster, a surfactant, an antiseptic agent/fungicide, a corrosion inhibitor, a chelating agent, a viscosity adjuster, an antioxidant, and/or an anti-mold agent. In addition, the types and the contents of the pH adjuster and the surfactant may be set similar to those described in the first treatment agent.

In addition, in order to secure an excellent friction fastness, the second treatment agent preferably contains substantially no pigments. The "contains substantially no pigments" indicates that no pigments are contained in the second treatment agent, or the content of the pigments with respect to the total mass (100 percent by mass) of the second treatment agent is less than 0.1 percent by mass.

1.2.2 Adhesion Method

The second treatment agent adhesion step is a step of spraying the second treatment agent from a nozzle front hole together with a heated gas to the cloth to which the first treatment agent is adhered so as to be adhered thereto, and the temperature of the nozzle front hole is a temperature higher than the standard boiling point of the second water-soluble organic solvent by 50° C. or more. In addition, the nozzle front hole is, for example, a nozzle front area corresponding to a position of a boundary between the inside and the outside of the nozzle hole.

When at least two types of second water-soluble organic solvents are used in combination, the standard boiling point of the second water-soluble organic solvent is a standard boiling point of a mixed solution of the at least two types of second water-soluble organic solvents and is calculated by the following general equation (2).

[Eq. 1]

$$BP_{ave} = \sum_{i=1}^{n} (M_i \times BP_i) \quad (2)$$

In the above general equation (2), $BP_{ave}$ represents a standard boiling point of a mixed solution of at least two types of second water-soluble organic solvents, $M_i$ represents a mass ratio of a second water-soluble organic solvent i to a total mass of the second water-soluble organic solvent (mass of the second water-soluble organic solvent i/total mass of all second water-soluble organic solvents), $BP_i$ represents a standard boiling point of the second water-soluble organic solvent i, and n represents an integer of 2 or more.

In the second treatment agent adhesion step, the temperature of the nozzle front hole is a temperature higher than the standard boiling point of the second water-soluble organic solvent by 50° C. or more, preferably by 60° C. or more, more preferably by 70° C. or more, even more preferably by 80° C. or more, and further preferably by 90° C. or more, even further preferably by 100° C. or more, and particularly preferably by 110° C. or more. When the temperature of the nozzle front hole is a temperature higher than the standard boiling point of the second water-soluble organic solvent by the predetermined value described above or more, in the state in which the second water-soluble organic solvent is further evaporated, the second treatment agent is likely to be adhered to the cloth, and the friction fastness can be made more preferable.

The temperature of the nozzle front hole can be measured, for example, by a thermocouple or a thermography. The temperature of the nozzle front hole is preferably 180° C. or more, more preferably 210° C. or more, even more preferably 240° C. or more, further preferably 270° C. or more, even further preferably 300° C. or more, and particularly preferably 330° C. or more. Although an upper limit of the temperature of the nozzle front hole is not particularly limited, for example, the upper limit described above is preferably 450° C. or less, more preferably 400° C. or less, and further preferably 380° C. or less.

As one embodiment of the second treatment agent adhesion step, the temperature of the nozzle front hole may be a temperature higher than the standard boiling point of a second water-soluble organic solvent having the highest standard boiling point by 50° C. or more and may be more preferably a temperature higher than the standard boiling point of the second water-soluble organic solvent having the highest standard boiling point by the above predetermined value or more.

As one embodiment of the second treatment agent adhesion step, the temperature of the heated gas immediately before being brought into contact with the second treatment agent may be a temperature higher than the standard boiling point of the second water-soluble organic solvent by 50° C. or more and may be more preferably a temperature higher than the standard boiling point of the second water-soluble organic solvent by the above predetermined value or more.

The nozzle to spray the second treatment agent and the heated gas is not particularly limited, and for example, a one-fluid nozzle to spray one fluid or a two-fluid nozzle to spray two fluids may be mentioned. In addition, the second treatment agent adhesion step may be performed such that the second treatment agent and the heated gas are separately sprayed from respective independent one-fluid nozzles. In the case described above, the nozzle to spray the second treatment agent and the nozzle to spray the heated gas are called a first nozzle and a second nozzle, respectively, and the temperature of a first nozzle front hole and/or the temperature of a second nozzle front hole can be set to a temperature higher than the standard boiling point of the second water-soluble organic solvent by 50° C. or more. In addition, the temperature of the second nozzle front hole is more preferably set to a temperature higher than the standard boiling point of the second water-soluble organic solvent by 50° C. or more, and as a result, the liquid (second treatment agent) is not likely to be heated in the first nozzle, the clogging is prevented, and the continuous ejection stability can be made more preferable.

In the treatment method according to this embodiment, the second treatment agent adhesion step is more preferably performed by spraying using a sprayer which includes a two-fluid nozzle. Since the second treatment agent and the heated gas are sprayed using a two-fluid nozzle, the size of the liquid droplet thus sprayed can be further decreased, and evaporation (in particular, evaporation until the second treatment agent is adhered to the cloth) of volatile components, such as water and the second water-soluble organic solvent, is promoted. In addition, since the two-fluid nozzle can spray at a higher pressure, the size of the liquid droplet thus sprayed is more likely to be decreased. In addition, since the second treatment agent can be sprayed by the two-fluid nozzle after being mixed with the heated gas, compared to the case in which the second treatment agent and the heated gas are sprayed by respective one-fluid nozzles and then mixed with each other, the second treatment agent can be efficiently heated, and the evaporation of the volatile components is likely to be further promoted. Hence, in the state in which the volatile components are further evaporated, the second treatment agent can be adhered to the cloth, and the friction fastness can be made further preferable.

Although a material of the nozzle is not particularly limited, for example, brass, stainless steel, or plastic may be mentioned. Among those mentioned above, since abrasion resistance and corrosion resistance are made more excellent, stainless steel is preferable.

Although a nozzle pressure can be appropriately adjusted, when the liquid is sprayed, the pressure is preferably 0.10 MPa or less, more preferably 0.08 MPa or less, and further preferably 0.05 MPa or less. In addition, when the gas is sprayed, the pressure is preferably 0.1 to 0.7 MPa, more preferably 0.2 to 0.6 MPa, and further preferably 0.3 to 0.5 MPa. In addition, the nozzle pressure indicates a pressure immediately before the fluid flows into the nozzle.

Although a spray liquid amount can be appropriately adjusted, for example, the liquid amount is preferably 1 to 20 mL/min, more preferably 3 to 18 mL/min, further preferably 5 to 16 mL/min, and particularly preferably 7 to 14 mL/min. In addition, although a spray air amount can be appropriately adjusted, for example, the air amount is preferably 9 to 200 L/min.

An average diameter of liquid droplets sprayed from the nozzle is, as the Sauter mean diameter, preferably 30 μm or less, more preferably 25 μm or less, further preferably 20 μm or less, and particularly preferably 15 μm or less. In addition, the Sauter mean diameter $D_{32}$ indicates the average particle diameter calculated by the following equation (3) in which the number of particles having a diameter $d_i$ is assumed to be $n_i$.

$$D_{32}=(\Sigma n_i \cdot d_i^3)/(\Sigma n_i \cdot d_i^2) \quad (3)$$

A coating amount per A4 size (210 mm×297 mm) of the second treatment agent in the second treatment agent adhesion step is preferably 1 to 10 g, more preferably 2 to 8 g, and further preferably 3 to 7 g. When the coating amount is in the range described above, the friction fastness tends to be made more preferable.

In the second treatment agent adhesion step, a surface temperature of the cloth is preferably 100° C. to 150° C., more preferably 100° C. to 140° C., further preferably 100° C. to 130° C., and particularly preferably 100° C. to 120° C. In this embodiment, since the second treatment agent is sprayed together with the heated gas, even when the heating of the cloth by a platen heater or the like is omitted or weakened, the surface temperature described above can be set in the range described above. In addition, when the surface temperature of the cloth in the second treatment agent adhesion step is in the range described above, the evaporation of the volatile components are likely to be further promoted, and the friction fastness tends to be made more preferable.

In the treatment method according to this embodiment, an interval between the first treatment agent adhesion step and the second treatment agent adhesion step is preferably 3.0 seconds or more, more preferably 3.5 seconds or more, further preferably 4.0 seconds or more, and particularly preferably 5.0 seconds or more. Although an upper limit of the interval described above is not particularly limited, for example, the upper limit described above is preferably 10.0 seconds or less, more preferably 9.0 seconds or less, and further preferably 8.0 seconds or less. In addition, the interval between the first treatment agent adhesion step and the second treatment agent adhesion step indicates a time period from the completion of the adhesion of the first treatment agent to the cloth to the adhesion of the second treatment agent to the area to which the first treatment agent is adhered. When the interval between the first treatment agent adhesion step and the second treatment agent adhesion step is in the range described above and is, in particular, 3.0 seconds or more, in the state in which the first treatment agent is further dried, the second treatment agent can be adhered, and hence, the bleeding tends to be further suppressed. In particular, when a pre-treatment step is performed on the cloth, since the second treatment agent can be adhered after the components of the first treatment agent are aggregated, the bleeding can be further suppressed.

1.3. Drying Step

The treatment method according to this embodiment may further include, after the second treatment agent adhesion step, a drying step of heating the cloth to a surface temperature of 140° C. to 160° C. The surface temperature of the cloth is more preferably 145° C. to 160° C., further preferably 150° C. to 160° C., and particularly preferably 155° C. to 160° C. In the treatment method according to this embodiment, since the second treatment agent is sprayed together with the heated gas, the evaporation of the volatile components are likely to be promoted. Hence, even when the heating temperature in the drying step is a mild temperature as shown in the range described above, sufficient drying can be performed, and hence, the friction fastness can be made preferable. In addition, the drying step may also be natural drying without heating of the cloth.

In addition, as another embodiment, after the second treatment agent adhesion step, a drying step of heating the cloth to a surface temperature of 100° C. to 140° C. may be provided. When the surface temperature is in the range as described above, it is preferable since a thermal load is not likely to be applied to a cloth containing chemical fibers of a nylon, a polyester, or the like.

A heating time in the drying step is preferably 1 to 5 minutes, more preferably 2 to 4 minutes, and particularly preferably 2 to 3 minutes. In the treatment method according to this embodiment, since the evaporation of the volatile components is likely to be promoted as described above, even when the heating time is as described above, a preferable friction fastness is likely to be obtained, and a thermal load on the cloth can be further reduced.

When the drying step is performed with heating, a heating method thereof is not particularly limited, and for example, a heat press method, an ordinary pressure steam method, a high pressure steam method, or a thermofix method may be mentioned. In addition, as a source of the heating, for example, infrared rays (infrared lamp) may be mentioned.

1.4. Pre-Treatment Liquid Adhesion Step

In order to improve a color development property of the pigment in a recorded matter, the treatment method according to this embodiment may include, before the first treatment agent is adhered to the cloth, a pre-treatment liquid adhesion step to adhere a pre-treatment liquid which aggregates the components of the first treatment agent.

As a method to adhere the pre-treatment liquid to the cloth, for example, there may be mentioned a method (immersion coating) in which the cloth is immersed in the pre-treatment liquid, a method (roller coating) in which the pre-treatment liquid is applied by a roll coater or the like, a method (spray coating) in which the pre-treatment liquid is sprayed by a spray device or the like, or a method (ink jet coating) in which the pre-treatment liquid is sprayed by an ink jet method may be mentioned, and any of them may be used.

As the pre-treatment liquid, a liquid at least containing a cationic compound and water may be used. The cationic compound has a function to aggregate the components, such as the pigment and/or the first resin particles, of the first treatment agent. Although the cationic compound is not particularly limited, for example, a metal salt, an acid, or a cationic organic compound may be mentioned, and as the cationic organic compound, for example, a cationic resin (cationic polymer) or a cationic surfactant may be used. Among those mentioned above, as the metal salt, a polyvalent metal salt is preferable, and as the cationic organic compound, a cationic resin is preferable. As the acid, an organic acid and/or an inorganic acid may be mentioned, and an organic acid is preferable. In addition, other components contained in the pre-treatment liquid may be similar to the components other than the pigment contained in the first treatment agent described above.

1.5. Other Steps

The treatment method according to this embodiment may also include, for example, before, at the same time, or immediately after the first treatment agent adhesion step, a primary heating step of heating the cloth.

2. EXAMPLES

Hereinafter, although the present disclosure will be described in more detail with reference to examples, the present disclosure is not limited thereto. Hereinafter, unless otherwise specifically noted, "%" is on a mass basis.

2.1 Preparation of First Treatment Agent and Second Treatment Agent

After components were charged in a container to have one of the compositions shown in the following Tables 1 and 2 and then mixed and stirred for 2 hours by a magnetic stirrer, filtration was performed using a membrane filter having a pore diameter of 5 μm, and by the same procedure as that described above, first treatment agents and second treatment agents according to Examples and Comparative Examples were obtained. The numerical values relating to the amounts shown in the following Tables 1 and 2 each represent percent by mass, and the ion exchange water was added so that the total mass of each treatment agent was 100 percent by mass.

In addition, as the pigment used for the first treatment agent, a pigment dispersion (pigment solid content: 20 percent by mass, resin solid content: 5 percent by weight) was used which was prepared such that after CW-1 (self-dispersible pigment, manufactured by Orient Chemical Industries Co., Ltd.) was dispersed in ion exchange water, a concentration thereof was adjusted.

TABLE 1

| | | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|---|---|
| FIRST TREATMENT AGENT | PIGMENT | CONCENTRATION OF PIGMENT SOLID CONTENT (CW-1, MANUFACTURED BY ORIENT CHEMICAL INDUSTRIES CO., LTD.) | 5.0 | 5.0 | 5.0 | 5.0 | 5.0 | 5.0 | 5.0 | 5.0 | 5.0 | 5.0 |
| | FIRST RESIN PARTICLE | TAKELAC W-6061, NON-CROSSLINKED URETHANE RESIN, MANUFACTURED BY MITSUI CHEMICALS INC. | 7.0 | 7.0 | 7.0 | | | 7.0 | 7.0 | 7.0 | 7.0 | 7.0 |
| | | VYLONAL MD2000, POLYESTER RESIN, MANUFACTURED BY TOYOBO CO., LTD. | | | | 7.0 | | | | | | |
| | | MOVINYL 6960, NON-CROSSLINKED ACRYLIC RESIN, MANUFACTURED BY JAPAN COATING RESIN CORPORATION | | | | | 7.0 | | | | | |
| | FIRST WATER-SOLUBLE ORGANIC SOLVENT | GLYCERIN | 5.0 | 5.0 | 5.0 | 5.0 | 5.0 | 5.0 | 5.0 | 5.0 | 5.0 | 5.0 |
| | | TRIETHYLENE GLYCOL | 5.0 | 5.0 | 5.0 | 5.0 | 5.0 | 5.0 | 5.0 | 5.0 | 5.0 | 5.0 |
| | OTHERS | KOH | 0.1 | 0.1 | 0.1 | 0.1 | 0.1 | 0.1 | 0.1 | 0.1 | 0.1 | 0.1 |
| | | SURFACTANT (OLFINE E1010, MANUFACTURED BY NISSHIN CHEMICAL INDUSTRY CO., LTD.) | 0.3 | 0.3 | 0.3 | 0.3 | 0.3 | 0.3 | 0.3 | 0.3 | 0.3 | 0.3 |

TABLE 1-continued

| | | | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|---|---|---|
| | | | ION EXCHANGE WATER | BALANCE | BALANCE | BALANCE | BALANCE | BALANCE | BALANCE | BALANCE | BALANCE | BALANCE | BALANCE |
| SECOND TREATMENT AGENT | SECOND RESIN PARTICLE | | TAKELAC W-6061, URETHANE RESIN, MANUFACTURED BY MITSUI CHEMICALS INC. | 10.0 | 10.0 | 10.0 | 10.0 | 10.0 | | | 6.0 | 15.0 | 10.0 |
| | | | VYLONAL MD2000, POLYESTER RESIN, MANUFACTURED BY TOYOBO CO., LTD. | — | | | — | — | 10.0 | — | — | — | — |
| | | | MOVINYL 6960, ACRYLIC RESIN, MANUFACTURED BY JAPAN COATING RESIN CORPORATION | — | | | — | — | — | 10.0 | — | — | — |
| | SECOND WATER-SOLUBLE ORGANIC SOLVENT | MOISTURIZER | TRIETHYLENE GLYCOL (B.P.: 287° C.) | 5.0 | | | 5.0 | 5.0 | 5.0 | 5.0 | 5.0 | 5.0 | 5.0 |
| | | | DIETHYLENE GLYCOL (B.P.: 245° C.) | | 5.0 | | | | | | | | |
| | | | PROPYLENE GLYCOL (B.P.: 189° C.) | | | 5.0 | | | | | | | |
| | | OTHER SOLVENTS | ETHYLENE GLYCOL DIETHYL ETHER (SP VALUE = 8.6) | | | | | | | | | | 3.0 |
| | | | DIETHYLENE GLYCOL MONOBUTYL ETHER (SP VALUE = 9.5) | | | | | | | | | | |
| | | | 2-METHYL-1,3-PENTANEDIOL (SP VALUE = 10.3) | | | | | | | | | | |
| | | | ETHYLENE GLYCOL MONOMETHYL | | | | | | | | | | |

TABLE 1-continued

| | | | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|---|---|
| | | ETHER (SP VALUE = 11.4) | | | | | | | | | | |
| | | 1,4-BUTANEDIOL (SP VALUE = 12.1) | | | | | | | | | | |
| | OTHER | ION EXCHANGE WATER | BALANCE | BALANCE | BALANCE | BALANCE | BALANCE | BALANCE | BALANCE | BALANCE | BALANCE | BALANCE |
| TREATMENT | SPRAY DEVICE | TEMPERATURE OF NOZZLE FRONT HOLE (° C.) | 350 | 300 | 300 | 350 | 350 | 350 | 350 | 350 | 350 | 350 |
| | TREATMENT INTERVAL | | 5 sec | 5 sec | 5 sec | 5 sec | 5 sec | 5 sec | 5 sec | 5 sec | 5 sec | 5 sec |
| | CLOTH | | COTTON | COTTON | COTTON | COTTON | COTTON | COTTON | COTTON | COTTN | COTTON | COTTON |
| DRYING | DRYING TEMPERATURE | CONVEYOR OVEN | 160° C. | 160° C. | 160° C. | 160° C. | 160° C. | 160° C. | 160° C. | 160° C. | 160° C. | 160° C. |
| | TIME | | 3 min | 3 min | 3 min | 3 min | 3 min | 3 min | 3 min | 3 min | 3 min | 3 min |
| EVALUATION RESULT | | WET FRICTION FASTNESS | A | A | AA | B | B | B | B | B | AA | A |
| | | CONTINUOUS EJECTION STABILITY | A | A | A | A | A | A | A | A | B | B |
| | | BLEEDING | AA | AA | AA | AA | AA | AA | AA | AA | AA | AA |

TABLE 2

| | | | EXAMPLE 11 | EXAMPLE 12 | EXAMPLE 13 | EXAMPLE 14 | EXAMPLE 15 | EXAMPLE 16 | EXAMPLE 17 | COMPARATIVE EXAMPLE 1 | COMPARATIVE EXAMPLE 2 | COMPARATIVE EXAMPLE 3 |
|---|---|---|---|---|---|---|---|---|---|---|---|---|
| FIRST TREATMENT AGENT | PIGMENT | CONCENTRATION OF PIGMENT SOLID CONTENT (CW-1, MANUFACTURED BY ORIENT CHEMICAL INDUSTRIES CO., LTD.) | 5.0 | 5.0 | 5.0 | 5.0 | 5.0 | 5.0 | 5.0 | 5.0 | 5.0 | 5.0 |
| | FIRST RESIN PARTICLE | TAKELAC W-6061, NON-CROSSLINKED URETHANE RESIN, MANUFACTURED BY MITSUI CHEMICALS INC. | 7.0 | 7.0 | 7.0 | 7.0 | 7.0 | 7.0 | 7.0 | 7.0 | 7.0 | 7.0 |
| | | VYLONAL MD2000, POLYESTER RESIN, MANUFACTURED BY TOYOBO CO., LTD. | | | | | | | | | | |
| | | MOVINYL 6960, NON-CROSSLINKED ACRYLIC RESIN, MANUFACTURED BY JAPAN COATING RESIN CORPORATION | | | | | | | | | | |
| | FIRST WATER-SOLUBLE ORGANIC SOLVENT | GLYCERIN | 5.0 | 5.0 | 5.0 | 5.0 | 5.0 | 5.0 | 5.0 | 5.0 | 5.0 | 5.0 |
| | | TRIETHYLENE GLYCOL | 5.0 | 5.0 | 5.0 | 5.0 | 5.0 | 5.0 | 5.0 | 5.0 | 5.0 | 5.0 |
| | OTHERS | KOH | 0.1 | 0.1 | 0.1 | 0.1 | 0.1 | 0.1 | 0.1 | 0.1 | 0.1 | 0.1 |
| | | SURFACTANT (OLFINE E1010, MANUFACTURED BY NISSHIN CHEMICAL INDUSTRY CO., LTD.) | 0.3 | 0.3 | 0.3 | 0.3 | 0.3 | 0.3 | 0.3 | 0.3 | 0.3 | 0.3 |

TABLE 2-continued

| | | | | EXAMPLE 11 | EXAMPLE 12 | EXAMPLE 13 | EXAMPLE 14 | EXAMPLE 15 | EXAMPLE 16 | EXAMPLE 17 | COMPARATIVE EXAMPLE 1 | COMPARATIVE EXAMPLE 2 | COMPARATIVE EXAMPLE 3 |
|---|---|---|---|---|---|---|---|---|---|---|---|---|---|
| | | | ION EXCHANGE WATER | BALANCE | BALANCE | BALANCE | BALANCE | BALANCE | BALANCE | BALANCE | BALANCE | BALANCE | BALANCE |
| SECOND TREATMENT AGENT | SECOND RESIN PARTICLE | | TAKELAC W-6061, URETHANE RESIN, MANUFACTURED BY MITSUI CHEMICALS INC. | 10.0 | 10.0 | 10.0 | 10.0 | 10.0 | 10.0 | 10.0 | — | 10.0 | 10.0 |
| | | | VYLONAL MD2000, POLYESTER RESIN, MANUFACTURED BY TOYOBO CO., LTD. | — | — | | | — | — | — | — | — | |
| | | | MOVINYL 6960, ACRYLIC RESIN, MANUFACTURED BY JAPAN COATING RESIN CORPORATION | — | — | | | — | — | — | — | — | |
| | SECOND WATER-SOLUBLE ORGANIC SOLVENT | MOISTURIZER | TRIETHYLENE GLYCOL (B.P.: 287° C.) | 5.0 | 5.0 | 5.0 | 5.0 | 5.0 | 5.0 | 5.0 | — | | 5.0 |
| | | | DIETHYLENE GLYCOL (B.P.: 245° C.) | | | | | | | | — | | |
| | | | PROPYLENE GLYCOL (B.P.: 189° C.) | | | | | | | | — | | |
| | | OTHER SOLVENTS | ETHYLENE GLYCOL DIETHYL ETHER (SP VALUE = 8.6) | | | | | | | | — | | |
| | | | DIETHYLENE GLYCOL MONOBUTYL ETHER (SP VALUE = 9.5) | 3.0 | | | | | | | — | | |
| | | | 2-METHYL-1,3-PENTANEDIOL (SP VALUE = 10.3) | | 3.0 | | | | | | — | | |

TABLE 2-continued

| | | | EXAMPLE 11 | EXAMPLE 12 | EXAMPLE 13 | EXAMPLE 14 | EXAMPLE 15 | EXAMPLE 16 | EXAMPLE 17 | COMPARATIVE EXAMPLE 1 | COMPARATIVE EXAMPLE 2 | COMPARATIVE EXAMPLE 3 |
|---|---|---|---|---|---|---|---|---|---|---|---|---|
| | | ETHYLENE GLYCOL MONOMETHYL ETHER (SP VALUE = 11.4) | | | 3.0 | | | | | — | | |
| | | 1,4-BUTANEDIOL (SP VALUED 12.1) | | | | 3.0 | | | | — | | |
| | OTHER | ION EXCHANGE WATER | BALANCE | BALANCE | BALANCE | BALANCE | BALANCE | BALANCE | BALANCE | — | BALANCE | BALANCE |
| TREATMENT | SPRAY DEVICE | TEMPERATURE OF NOZZLE FRONT HOLE (° C.) | 350 | 350 | 350 | 350 | 350 | 350 | 350 | — | 350 | 300 |
| | TREATMENT INTERVAL | | 5 sec | 5 sec | 5 sec | 5 sec | 5 sec | 2.5 sec | 5 sec | 5 sec | 5 sec | 5 sec |
| | CLOTH | | COTTON | COTTON | COTTON | COTTON | COTTON | COTTON | POLYESTER | COTTON | COTTON | COTTON |
| DRYING | DRYING TEMPERATURE | CONVEYOR OVEN | 160° C. | 160° C. | 160° C. | 160° C. | 140° C. | 160° C. | 145° C. | 160° C. | 160° C. | 160° C. |
| | TIME | | 3 min | 3 min | 3 min | 3 min | 3 min | 3 min | 3 min | 3 min | 3 min | 3 min |
| EVALUATION RESULT | | WET FRICTION FASTNESS | AA | AA | B | B | B | A | B | D | A | C |
| | | CONTINUOUS EJECTION STABILITY | A | A | A | A | A | A | A | A | C | A |
| | | BLEEDING | AA | AA | AA | AA | AA | A | A | AA | AA | AA |

Tables 1 and 2 will be further additionally described.

As a spray device, a sprayer including a two-fluid nozzle, Mini Atomizing Nozzle MMA-10 (manufactured by Everloy Shoji Co., Ltd.), was used. In the row of "TEMPERATURE OF NOZZLE FRONT HOLE", a temperature of heated air immediately before being mixed with the coating liquid (second treatment agent) in the nozzle is shown.

"SP VALUE" was an SP value based on Hansen method, and the unit thereof was $[(cal/cm^3)^{1/2}]$.

2.2 Printing Conditions

The first treatment agent was ejected from an ink jet head by an ink jet method using an ink jet printer (PX-G930, manufactured by Seiko Epson Corporation) and was printed on the cloth shown in each row in the above Tables 1 and 2. A printed pattern was formed to have a resolution of 1,440×1,440 dpi.

2.3 Spray Conditions

After the printing was completed, the heated air and the second treatment agent (coating liquid) shown in the above Tables 1 and 2 were supplied to the two-fluid nozzle, Mini Atomizing Nozzle MMA-10 (manufactured by Everloy Shoji Co., Ltd.), functioning as a spray nozzle (sprayer) and were sprayed on a printing surface of a recording medium from a position apart from the recording medium by 20 cm in a vertical direction, so that the coating liquid was applied thereon. In this case, a scanning rate of the spray nozzle (relative rate between the recording medium and the spray nozzle) was adjusted so that a coating amount of the coating liquid was 5 g per A4 size. However, in Comparative Example 1, the second treatment agent was not sprayed. In addition, a time period from the printing completion to the coating of the coating liquid is called "TREATMENT INTERVAL" and is shown in the above Tables 1 and 2.

The heated air was generated by a hot wind generator HAP4020 (manufactured by Hakko Electric Co., Ltd.), and a temperature immediately before the heated air was mixed with the coating liquid in the spray nozzle was measured by a K-type thermocouple (manufactured by Three High Co., Ltd.) having a wire diameter of 0.2 mm and is shown in the row of "TEMPERATURE OF NOZZLE FRONT HOLE" in the above Tables 1 and 2. In this case, a preset temperature of the hot wind generator was adjusted so that the air temperature coincided with a targeted value. In addition, a supply amount of the coating liquid to the spray nozzle was controlled at 10 mL/min.

Furthermore, after the coating of the coating liquid was finished, the recording medium was heated at the drying temperature and for the time shown in the above Tables 1 and 2, so that a printed matter of each example was obtained.

2.4 Evaluation Method

In each Example and each Comparative Example, evaluation tests of wet friction fastness, continuous ejection stability, and bleeding were performed. Hereinafter, the methods and evaluation criteria thereof will be described.

2.4.1 Wet Friction Fastness

The printed matter thus obtained in each example was evaluated in accordance with a wet test defined in JIS L 0849, "Test method for Color Fastness to Friction", using a gray scale based on the following evaluation criteria. In addition, the test was performed by a crock meter method. The evaluation was performed by judging the contamination grade by a visual method according to Clause 10 (determination of color fastness) of JIS L 0801 cited in JIS L 0849.

When the evaluation was B or higher, the wet friction fastness was regarded as preferable.

Evaluation Criteria

AA: Friction fastness is 4 grade or higher.

A: Friction fastness is 3 grade.

B: Friction fastness is 2-3 grade (intermediate grade).

C: Friction fastness is 2 grade.

D: Friction fastness is lower than 2 grade.

2.4.2 Continuous Ejection Stability

Under the spray conditions described above, the spray nozzle was continuously operated. From a time period in which a continuous operation could be performed, the evaluation was performed by the following evaluation criteria. In addition, when the evaluation was B or higher, the ejection stability was regarded as preferable.

Evaluation Criteria

A: Spray nozzle can be continuously operated for 3 hours or more.

B: Spray nozzle can be continuously operated for 2 to less than 3 hours.

C: Spray nozzle cannot be continuously operated over 2 hours.

2.4.3 Bleeding

Bleeding of a boundary portion between an image recorded area and an unrecorded white portion of the printed matter obtained in each example was observed by visual inspection and then evaluated by the following evaluation criteria. In addition, when the evaluation was B or higher, the result was regarded as preferable.

Evaluation Criteria

AA: No bleeding is observed.

A: Bleeding is slightly present but not observed by visual inspection.

B: Bleeding is slightly observed by visual inspection but is at no problem level.

C: Bleeding is apparently observed by visual inspection and is at problem level.

2.5 Evaluation Results

The evaluation results are shown in the above Tables 1 and 2.

From the above Tables 1 and 2, it is found that in each Example in which the treatment method includes a first treatment agent adhesion step of ejecting a first treatment agent which contains a pigment, first resin particles, water, and a first water-soluble organic solvent from an ink jet head so as to be adhered to a cloth; and a second treatment agent adhesion step of spraying a second treatment agent which contains second resin particles, water, and a second water-soluble organic solvent from a nozzle front hole together with a heated gas to the cloth to which the first treatment agent is adhered so as to be adhered thereto, and the nozzle front hole has a temperature higher than a standard boiling point of the second water-soluble organic solvent by 50° C. or more, the friction fastness and the continuous ejection stability are both made excellent.

From the comparison between Example 1 and Comparative Example 1, it is found that when the second treatment agent is not used, the wet friction fastness is inferior.

From the comparison between Example 1 and Comparative Example 2, it is found that even when the second treatment agent is used, if the second water-soluble organic solvent is not contained, the continuous ejection stability is inferior.

From the comparison between Example 1 and Comparative Example 3, it is found that when the temperature of the nozzle front hole is a temperature not higher than the standard boiling point of the second water-soluble organic solvent by 50° C. or more, the wet friction fastness is inferior.

From the results of Examples 1, 2, and 3, it is found that regardless of the type of second water-soluble organic solvent, when the temperature of the nozzle front hole is a temperature higher than the standard boiling point of the second water-soluble organic solvent by 50° C. or more, the wet friction fastness is made excellent.

From the results of Examples 1 and 4 to 7, it is found that when the first resin particles and the second resin particles each contain an urethane resin, the wet friction fastness is made more excellent.

From the results of Examples 1, 8, and 9, it is found that when the content of the second resin particles in the second treatment agent is in a predetermined range, the wet friction fastness and the continuous ejection stability both can be made preferable with good balance.

From the results of Examples 1 and 10 to 14, it is found that when the second treatment agent contains a second water-soluble organic solvent having an SP value in a predetermined range, the wet friction fastness is made more excellent.

From the results of Examples 1 and 15, it is found that in the drying step performed after the second treatment agent adhesion step, when the drying is performed at a predetermined temperature or more, the wet friction fastness is made more excellent.

From the results of Examples 1 and 16, it is found that when the interval between the first treatment agent adhesion step and the second treatment agent adhesion step is a predetermined time or more, the bleeding is more unlikely to be generated.

From the results of Examples 1 and 17, it is found that even if the cloth contains chemical fibers, and the drying cannot be performed at a high temperature for a long time, a preferable wet friction fastness can be obtained.

From the embodiments described above, the following conclusions can be obtained.

A treatment method according to an aspect of the present disclosure includes a first treatment agent adhesion step of ejecting a first treatment agent which contains a pigment, first resin particles, water, and a first water-soluble organic solvent from an ink jet head so as to be adhered to a cloth; and a second treatment agent adhesion step of spraying a second treatment agent which contains second resin particles, water, and a second water-soluble organic solvent from a nozzle front hole together with a heated gas to the cloth to which the first treatment agent is adhered so as to be adhered thereto, and the nozzle front hole has a temperature higher than a standard boiling point of the second water-soluble organic solvent by 50° C. or more.

In the treatment method according to the above aspect, the first resin particles may contain an urethane resin.

In the treatment method according to any one of the aspects, the second resin particles may contain an urethane resin.

In the treatment method according to any one of the aspects, a content of the second resin particles with respect to a total mass of the second treatment agent may be 6.0 to 15.0 percent by mass.

In the treatment method according to any one of the aspects, the content of the second resin particles with respect to the total mass of the second treatment agent may be higher than a content of the first resin particles with respect to a total mass of the first treatment agent.

In the treatment method according to any one of the aspects, a content of the second water-soluble organic solvent with respect to the total mass of the second treatment agent may be 5.0 percent by mass or more.

In the treatment method according to any one of the aspects, a content of a second water-soluble organic solvent having a standard boiling point of 180° C. or more with respect to the total mass of the second treatment agent may be 5.0 percent by mass or more.

In the treatment method according to any one of the aspects, the second treatment agent may contain a second water-soluble organic solvent having an SP value of 9.0 to 11.0.

In the treatment method according to any one of the aspects, after the second treatment agent adhesion step, a drying step of heating the cloth to a surface temperature of 140° C. to 160° C. may be further provided.

In the treatment method according to any one of the aspects, the second treatment agent adhesion step may be performed by spraying the second treatment agent from a sprayer including a two-fluid nozzle.

In the treatment method according to any one of the aspects, the cloth may have a surface temperature of 100° C. to 150° C. in the second treatment agent adhesion step.

In the treatment method according to any one of the aspects, the cloth may be one selected from the group consisting of a polyester and a nylon.

In the treatment method according to any one of the aspects, the first treatment agent adhesion step and the second treatment agent adhesion step may be performed with an interval of 3.0 seconds or more.

The present disclosure is not limited to the embodiments described above and may be variously change and/or modified. For example, the present disclosure includes substantially the same structure as the structure described in the embodiment. That is, the substantially the same structure includes, for example, the structure in which the function, the method, and the result are the same as those described above, or the structure in which the object and the effect are the same as those described above. In addition, the present disclosure includes the structure in which a nonessential portion of the structure described in the embodiment is replaced with something else. In addition, the present disclosure includes the structure which performs the same operational effect as that of the structure described in the embodiment or the structure which is able to achieve the same object as that of the structure described in the embodiment. In addition, the present disclosure includes the structure in which a known technique is added to the structure described in the embodiment.

What is claimed is:

1. A treatment method comprising:

a first treatment agent adhesion step of ejecting a first treatment agent which contains a pigment, first resin particles, water, and a first water-soluble organic solvent from an ink jet head so as to be adhered to a cloth; and a second treatment agent adhesion step of spraying a second treatment agent which contains second resin particles, water, and a second water-soluble organic solvent from a nozzle front hole together with a heated gas to the cloth to which the first treatment agent is adhered so as to be adhered thereto, wherein the nozzle front hole has a temperature higher than a standard boiling point of the second water-soluble organic solvent by 50° C. or more.

2. The treatment method according to claim 1, wherein the first resin particles contain an urethane resin.

3. The treatment method according to claim 1, wherein the second resin particles contain an urethane resin.

4. The treatment method according to claim 1, wherein a content of the second resin particles with respect to a total mass of the second treatment agent is 6.0 to 15.0 percent by mass.

5. The treatment method according to claim 1, wherein a content of the second resin particles with respect to a total mass of the second treatment agent is higher than a content of the first resin particles with respect to a total mass of the first treatment agent.

6. The treatment method according to claim 1, wherein a content of the second water-soluble organic solvent with respect to a total mass of the second treatment agent is 5.0 percent by mass or more.

7. The treatment method according to claim 1, wherein a content of a second water-soluble organic solvent having a standard boiling point of 180° C. or more with respect to a total mass of the second treatment agent is 5.0 percent by mass or more.

8. The treatment method according to claim 1, wherein the second treatment agent contains a second water-soluble organic solvent having an SP value of 9.0 to 11.0.

9. The treatment method according to claim 1, further comprising, after the second treatment agent adhesion step, a drying step of heating the cloth to a surface temperature of 140° C. to 160° C.

10. The treatment method according to claim 1, wherein the second treatment agent adhesion step is performed by spraying the second treatment agent from a sprayer including a two-fluid nozzle.

11. The treatment method according to claim 1, wherein in the second treatment agent adhesion step, the cloth has a surface temperature of 100° C. to 150° C.

12. The treatment method according to claim 1, wherein the cloth is one selected from the group consisting of a polyester and a nylon.

13. The treatment method according to claim 1, wherein the first treatment agent adhesion step and the second treatment agent adhesion step are performed with an interval of 3.0 seconds or more.

* * * * *